(12) United States Patent
Scinicariello

(10) Patent No.: US 9,945,304 B2
(45) Date of Patent: Apr. 17, 2018

(54) PRESSURING SYSTEM FOR A VEHICLE ENGINE COMPONENTS FOR WATER PROTECTION

(71) Applicant: Lombardini S.R.L., Reggio nell'Emilia OT (IT)

(72) Inventor: Nicola Scinicariello, Reggio Emilia (IT)

(73) Assignee: LOMBARDINI S.R.L., Reggio Nell'Emilia (IT)

( * ) Notice: Subject to any disclaimer, the term of this patent is extended or adjusted under 35 U.S.C. 154(b) by 0 days.

(21) Appl. No.: 15/235,563

(22) Filed: Aug. 12, 2016

(65) Prior Publication Data

US 2017/0045006 A1    Feb. 16, 2017

(30) Foreign Application Priority Data

Aug. 13, 2015   (IT) .......................... 102015000044486

(51) Int. Cl.
| F02D 41/00 | (2006.01) |
| B60F 3/00 | (2006.01) |
| F01M 13/06 | (2006.01) |
| F02M 35/10 | (2006.01) |
| F02M 35/104 | (2006.01) |

(52) U.S. Cl.
CPC ........ *F02D 41/0002* (2013.01); *B60F 3/0053* (2013.01); *F01M 13/06* (2013.01); *F02M 35/104* (2013.01); *F02M 35/10019* (2013.01); *F02M 35/10078* (2013.01); *F02M 35/10275* (2013.01); *F02M 35/10373* (2013.01)

(58) Field of Classification Search
CPC .. F02D 41/0002; F01M 13/06; F02M 35/104; F02M 35/10019; F02M 35/10078; F02M 35/10275; F02M 35/10373; B60F 3/0053

USPC ...... 123/188.14, 190.11, 190.13, 190.4, 434, 123/193.3, 193.5, 195 C

See application file for complete search history.

(56) References Cited

U.S. PATENT DOCUMENTS

| 2,429,732 A | 10/1947 | Roos |
| 2,775,960 A | 1/1957 | Druzynski |
| 2,782,773 A | 2/1957 | Stone |
| 2,822,790 A | 2/1958 | Bartholome |
| 3,477,413 A | 11/1969 | Johnston et al. |

(Continued)

FOREIGN PATENT DOCUMENTS

| CN | 203571060 U | 4/2014 |
| FR | 918023 A | 1/1947 |

(Continued)

OTHER PUBLICATIONS

Jp 62-220776 Abstract English Translation.*

(Continued)

*Primary Examiner* — John Kwon
*Assistant Examiner* — Johnny H Hoang
(74) *Attorney, Agent, or Firm* — Klintworth & Rozenblat IP LLP

(57) ABSTRACT

A pressuring system for a vehicle engine includes an intake manifold into which ambient gases flows. A control valve connects to the intake manifold. An engine block connects to the intake manifold and connected to a gases outlet. A timing belt cover connects to the engine block. A gases pipe connects between the control valve and the timing belt cover.

10 Claims, 18 Drawing Sheets

(56) References Cited

U.S. PATENT DOCUMENTS

| | | | |
|---|---|---|---|
| 4,119,077 A * | 10/1978 | Vallejos | F01L 5/02 |
| | | | 123/188.4 |
| 4,497,285 A | 2/1985 | Kondo | |
| 4,498,285 A | 2/1985 | Kreij | |
| 4,793,300 A * | 12/1988 | Kadoshima | F02B 67/06 |
| | | | 123/195 A |
| 4,878,467 A | 11/1989 | Schmidt | |
| 5,375,569 A * | 12/1994 | Santella | B29C 45/1676 |
| | | | 123/195 C |
| 5,490,485 A * | 2/1996 | Kutlucinar | F01L 7/022 |
| | | | 123/190.4 |
| 7,363,999 B2 | 4/2008 | Hastings | |
| 8,490,725 B2 | 7/2013 | Takamatsu et al. | |
| 8,614,523 B2 | 12/2013 | Reynolds | |
| 8,851,216 B2 | 10/2014 | Schiek et al. | |
| 2001/0003080 A1 * | 6/2001 | Morikami | F16F 15/30 |
| | | | 440/53 |
| 2007/0277761 A1 * | 12/2007 | Takada | F01L 1/02 |
| | | | 123/90.31 |
| 2008/0202881 A1 * | 8/2008 | Menne | F16D 25/0638 |
| | | | 192/3.25 |
| 2009/0314364 A1 * | 12/2009 | Kesner | F01D 17/145 |
| | | | 137/629 |
| 2014/0165947 A1 * | 6/2014 | Krittian | F02N 11/0803 |
| | | | 123/179.31 |
| 2014/0338631 A1 * | 11/2014 | Ellis | F01L 7/021 |
| | | | 123/190.4 |
| 2016/0192463 A1 * | 6/2016 | Tanahashi | B60K 13/02 |
| | | | 361/216 |

FOREIGN PATENT DOCUMENTS

| | | | | |
|---|---|---|---|---|
| GB | 918023 A | | 9/1958 | |
| JP | 62-220776 | * | 9/1987 | F16H 57/44 |
| JP | 1-182192 A | | 7/1989 | |
| JP | 2012-140868 A | | 7/2012 | |

OTHER PUBLICATIONS

Office Action dated Jun. 1, 2016 for Italian Patent Application No. 2015000044486, filed Aug. 13, 2016, 1 page.

Search Report dated Apr. 26, 2016 for Italian Patent Application No. 2015000044486, filed Aug. 13, 2015, 7 pages.

Extended European Search Report dated Dec. 19, 2016 for European Patent Application No. 16183100, 5 pages.

Office Action for Chinese Patent Application No. 201610654084.X dated Dec. 25, 2017, 6 pages.

* cited by examiner

PRESSURING SYSTEM FOR A VEHICLE ENGINE COMPONENTS FOR WATER PROTECTION

FIELD OF THE DISCLOSURE

The present disclosure relates to a system for pressuring a belt cover of a vehicle engine. The pressuring system may also be used to pressure a starter motor of a vehicle engine.

BACKGROUND

Timing belt components used on vehicles are not designed to be operated in a submerged condition underwater. Starter motor components, while sealed, are also not designed to be operated in a submerged condition underwater.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
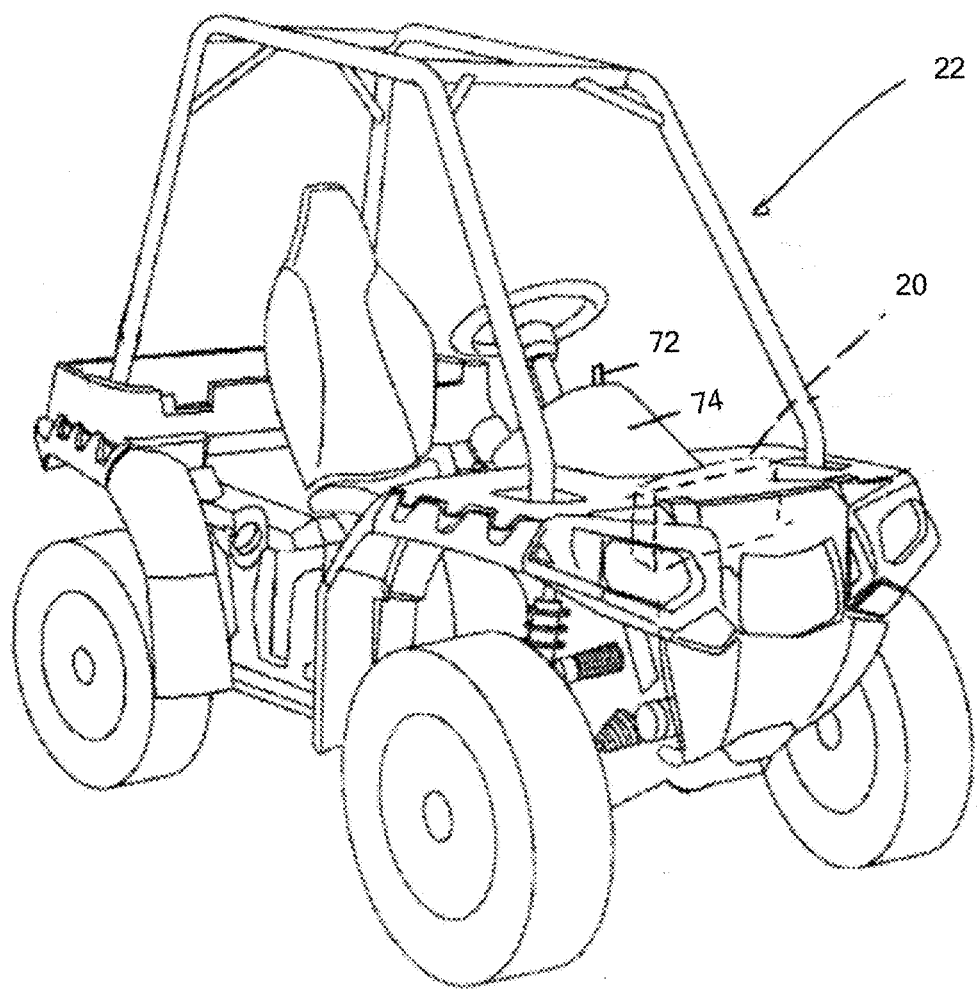
FIG. 1 is a perspective view of a vehicle.
Figure 2:
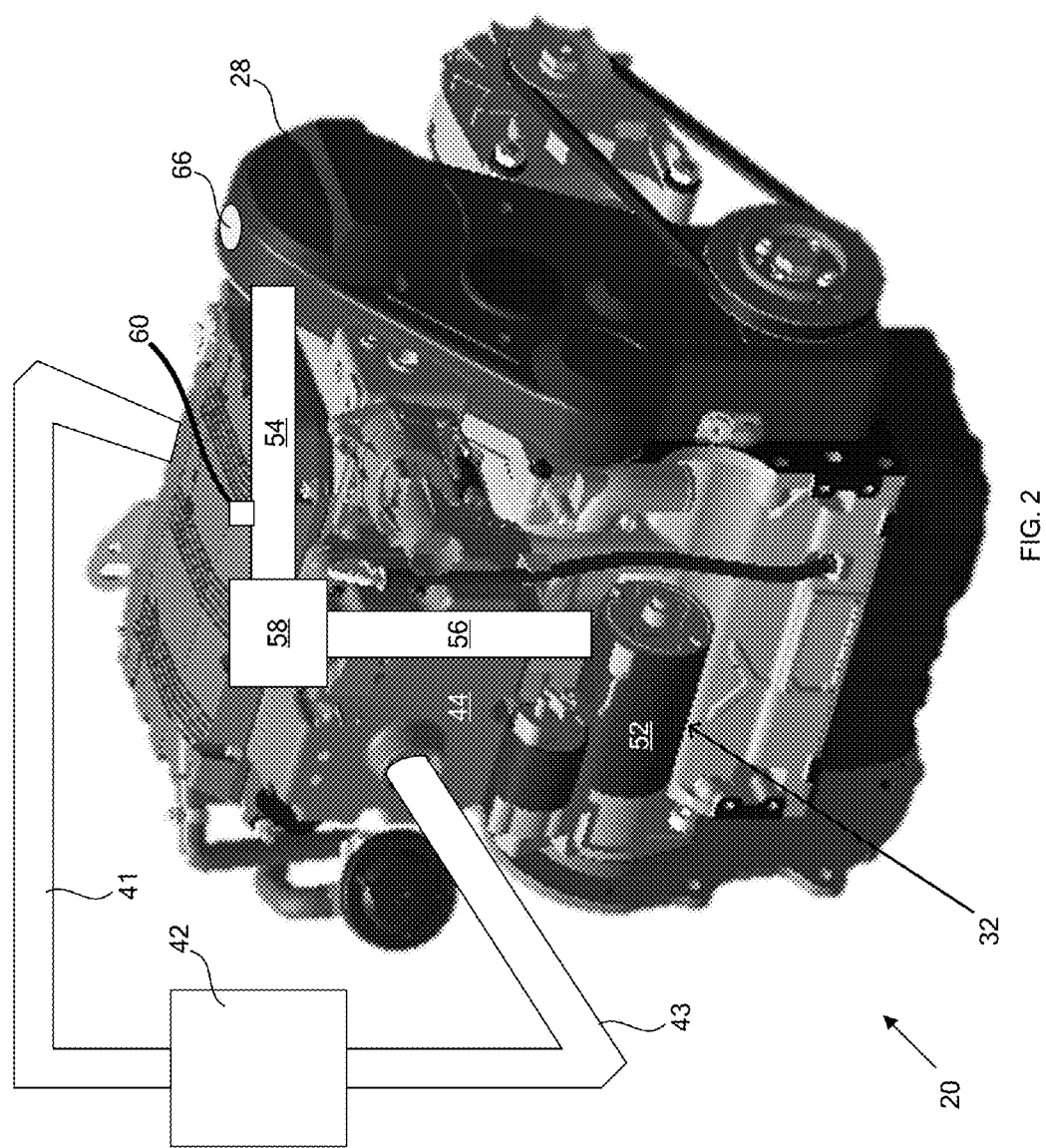
FIGS. 2 and 3 are perspective views of an engine for the vehicle which incorporates the features of the disclosure.
Figure 3:
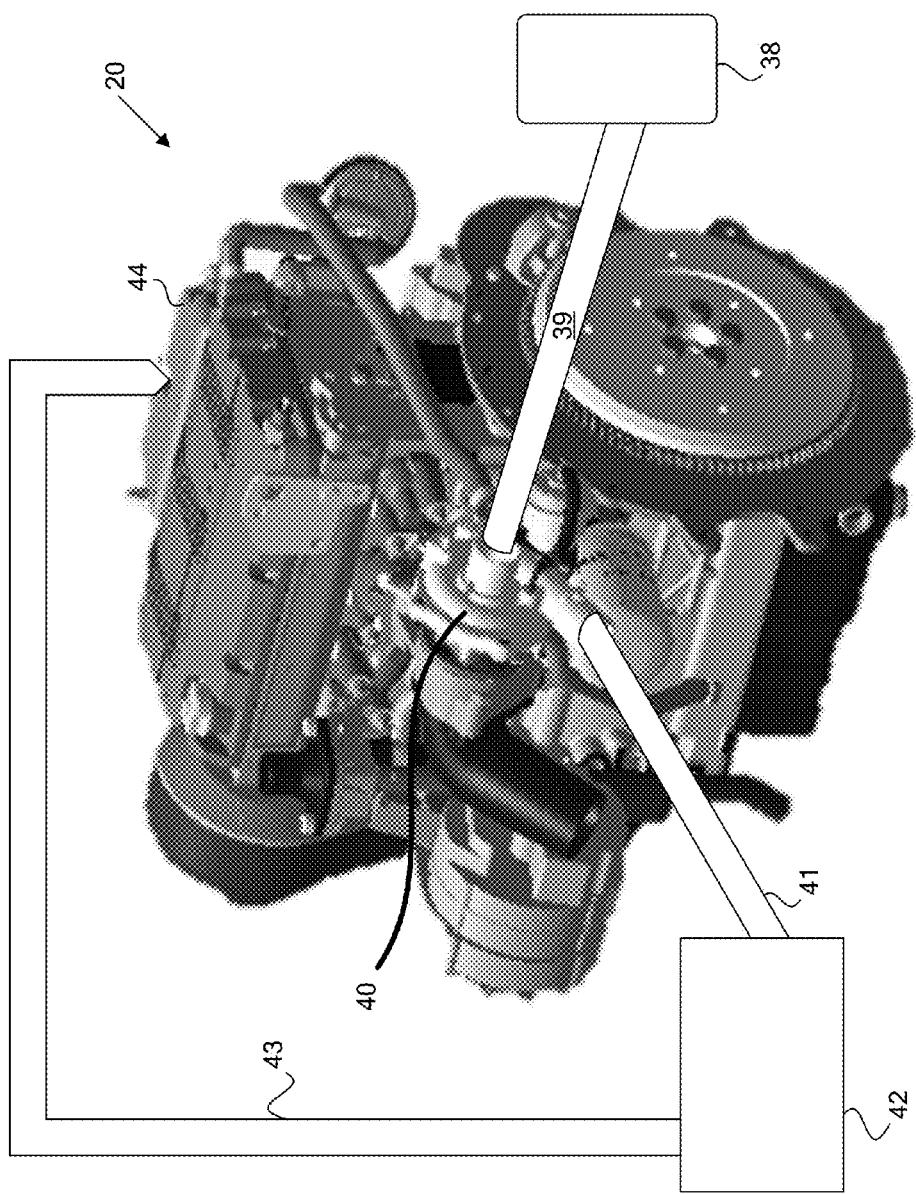
Figure 4:
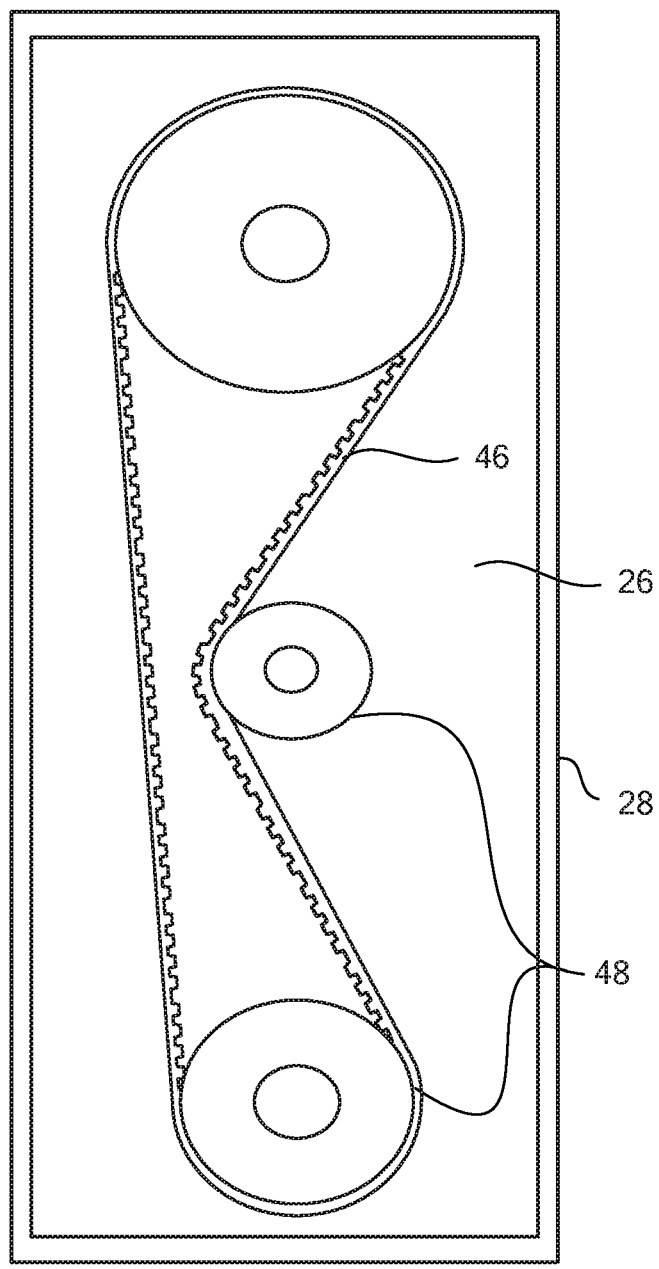
FIG. 4 is a cross-sectional view of a timing belt, its operating components, its cover and an engine block.
Figure 5:
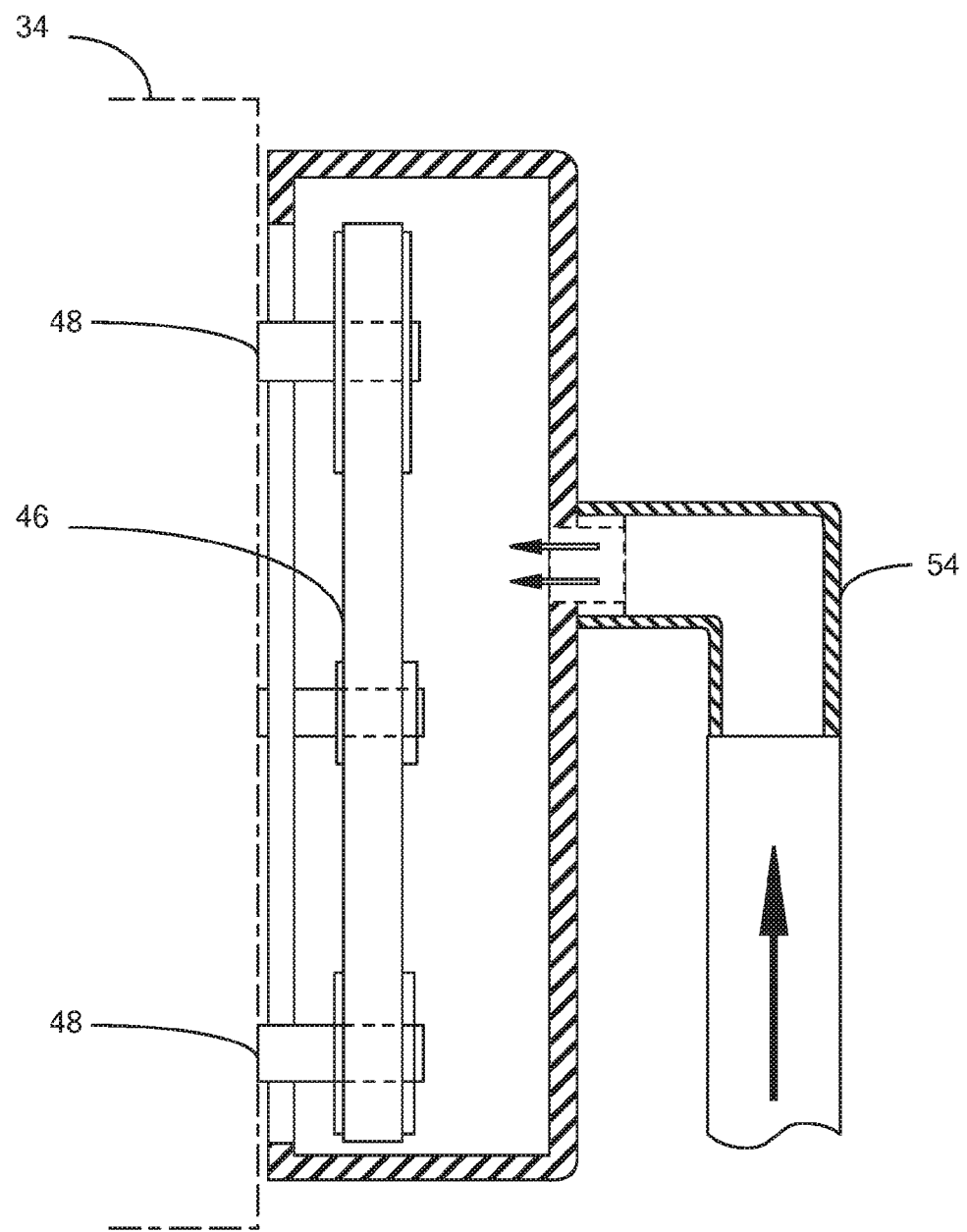
FIG. 5 is a further cross-sectional view of the components of FIG. 4.
Figure 6:
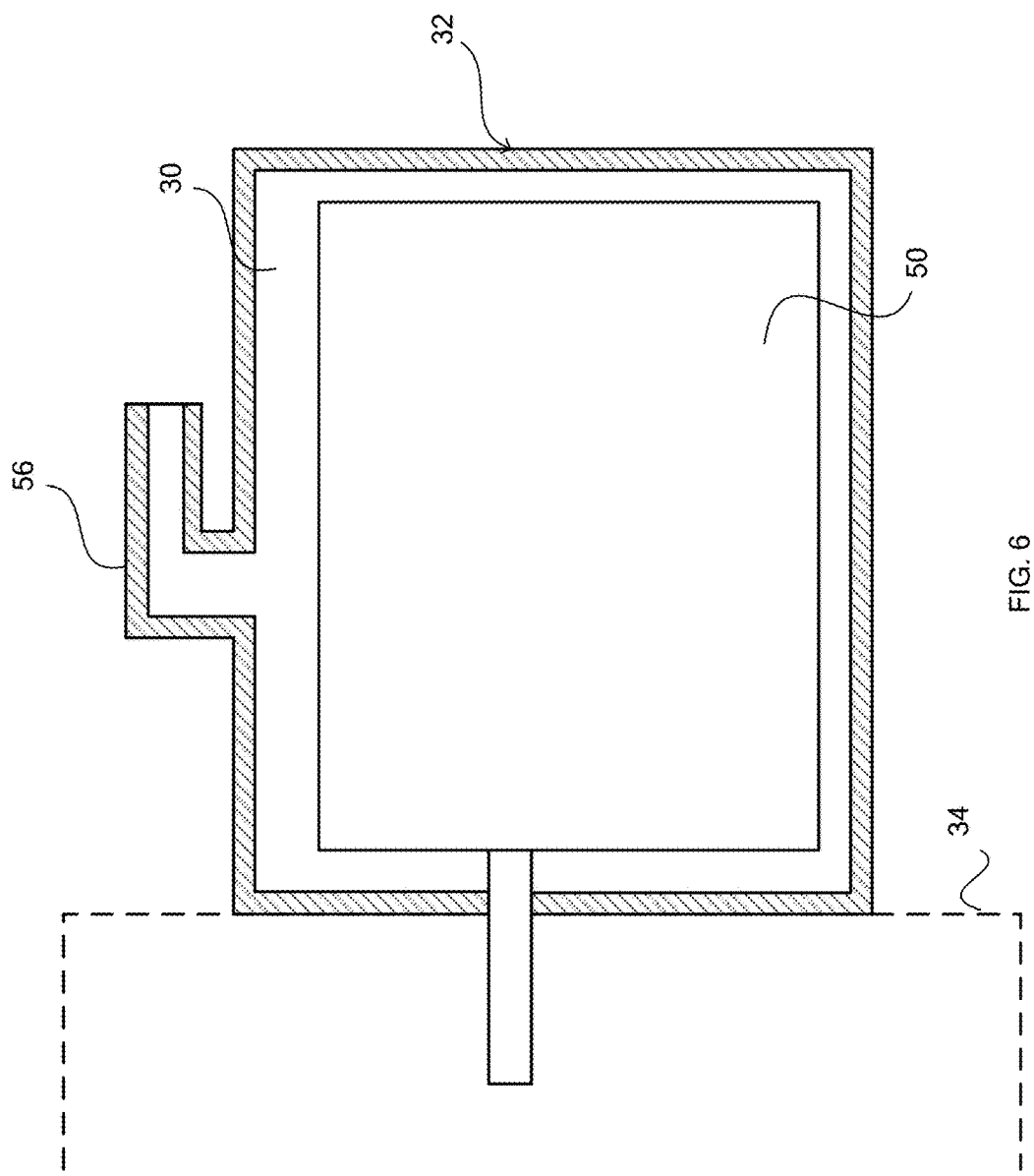
FIG. 6 is a cross-sectional view of a starter motor and the engine block.

In FIGS. 1-6, an engine 20 for a vehicle 22 is provided which has a pressuring system 24 for pressuring a cavity 26 formed by a timing belt cover 28, and may be used to pressurize a cavity 30 formed as part of the starter motor 32 to minimize or prevent water and/or debris entry into the cavities 26, 30 when the vehicle 22 is submerged, to prevent water, for example rainwater, and/or debris entry when the vehicle 22 is running on land, or dust/debris entry into the cavities 26, 30 when the vehicle 22 is running with heavy dust. The pressuring system 24 introduces gases under pressure into the cavities 26, 30 to minimize or prevent the ingress of water/dust/debris into the cavities 26, 30, thereby protecting the components within the cavities 26, 30.

The engine 20 has an engine block 34 which include the customary components for enabling operation of the vehicle 22. The specific components which relate to the pressuring system 24 are specifically discussed herein.

In a typical engine 20, gases flows from atmosphere through an intake system 36 to the engine block 34. Waste gases travel from the engine block 34 to an outlet 37. The intake system 36 includes an air filter 38 which receives gases from the atmosphere, an air hose 39 between the air filter 38 and a turbocompressor inlet, a turbocompressor 40 which receives the gases from the turbocompressor inlet and compresses the gases, an air hose 41 between the turbocompressor 40 and an air cooler inlet, an air cooler 42 which receives the compressed gases from the air cooler inlet to cool the compressed gases generated by the turbocompressor 40, an air hose 43 between the air cooler 42 and an intake manifold inlet, and an intake manifold 44 which receives the cooled gases from the air cooler 42. The cooled compressed gases flow through the intake manifold 44 and into the engine block 34 for use by the engine 20 in a typical manner. The pressure of the gases in the intake manifold 44 is greater than ambient.

The timing belt cover 28 is attached to the engine block 34 in a customary manner. A timing belt 46, which is used in operating the engine 20 in a known manner, is mounted within the cavity 26. The timing belt 46 is driven in a conventional manner and includes operating components 48, such as crank shafts, sprockets, pulleys, bearings, oil seals, etc., which are mounted within the cavity 26 and interact with the components in the engine block 34. The timing belt cover 28 is not completely sealed to the engine block 34. The timing belt 46 and its components 48 are not designed to operate in a submerged situation.

The starter motor 32 is attached to the engine block 34 in a customary manner. The components 50 of the starter motor 32 are mounted within the cavity 30 which is formed by a starter motor cover 52. Starter motors 32 are normally protected against water intrusion, but the starter motor cover 52 is not completely sealed against water intrusion. A starter motor 32 is not designed to operate in a submerged situation.

As shown in the figures, the pressuring system 24 includes a gases pipe 54 which extends between the intake manifold 44 and the timing belt cover 28 for feeding pressurized gases from the intake manifold 44 to the timing belt cavity 26. The gases pipe 54 is sealed to the intake manifold 44 and to the timing belt cover 28 and suitable connectors (not shown) may be provided to effect these connections. When pressurized gases are introduced into the cavity 26, a substantially permanent overpressure is generated in the cavity 26 and minimizes the entry of water and/or dust and/or debris and the like into the cavity 26 through any air gaps in the timing belt cover 28.

Figure 8:
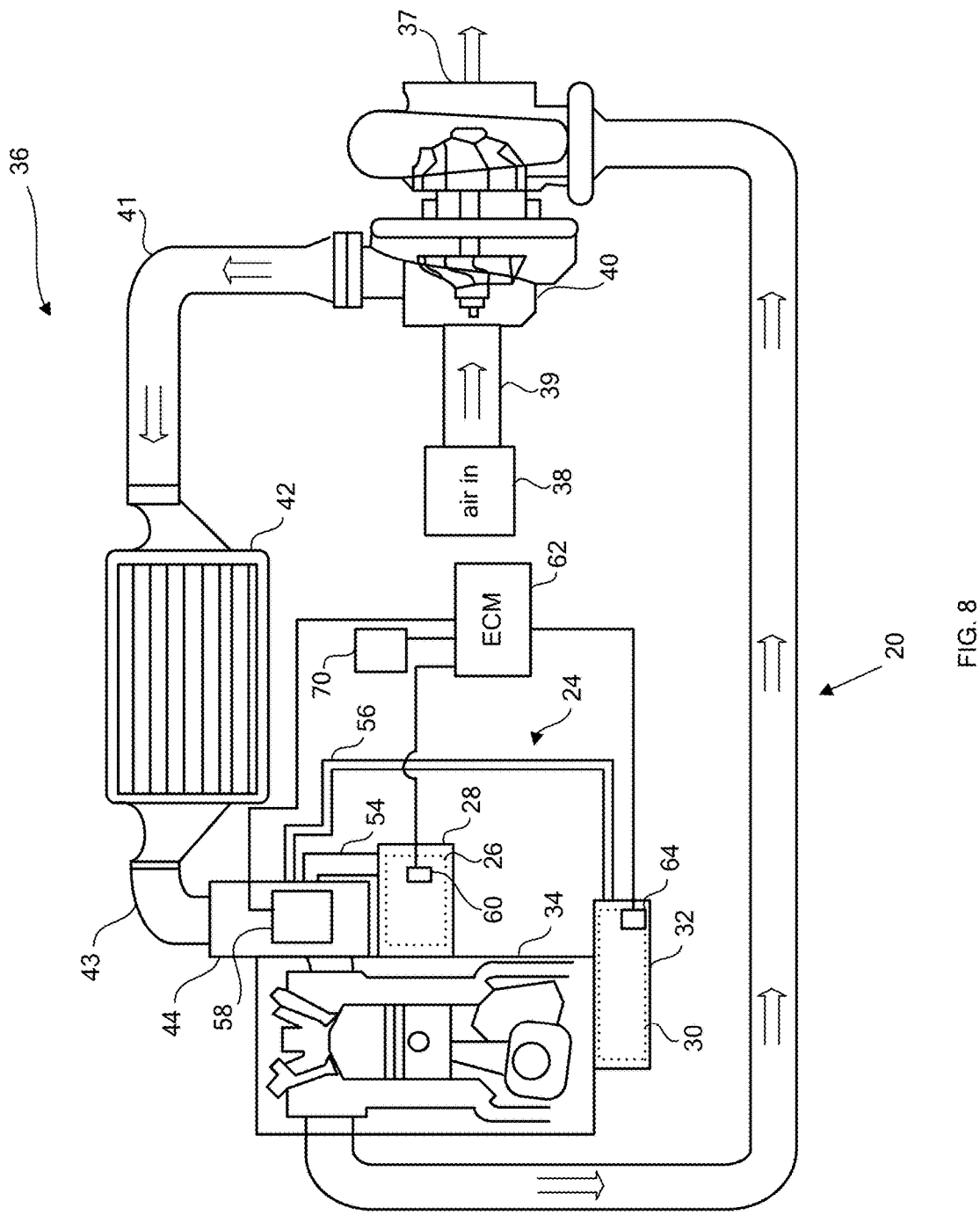
Figure 11:
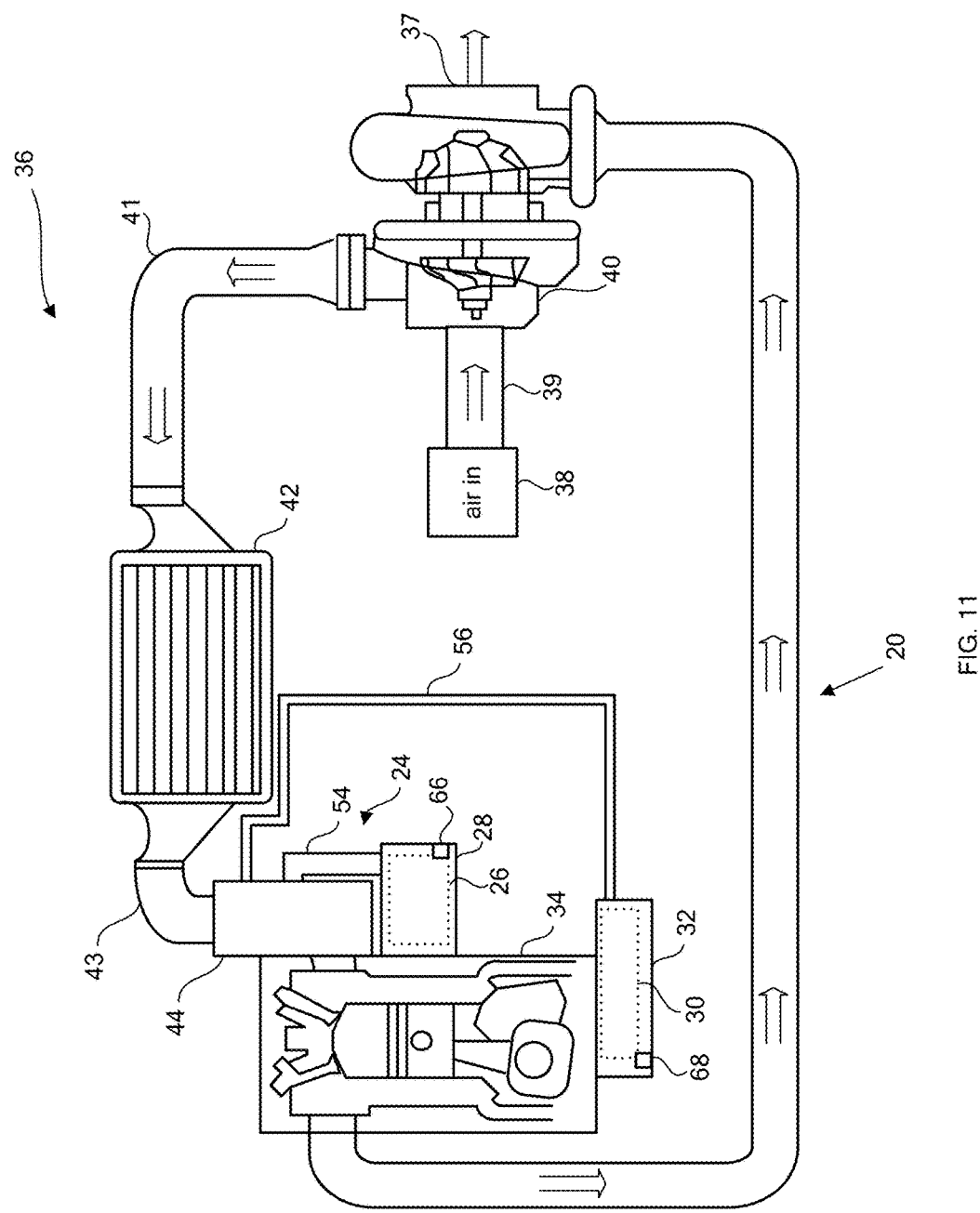
Figure 14:
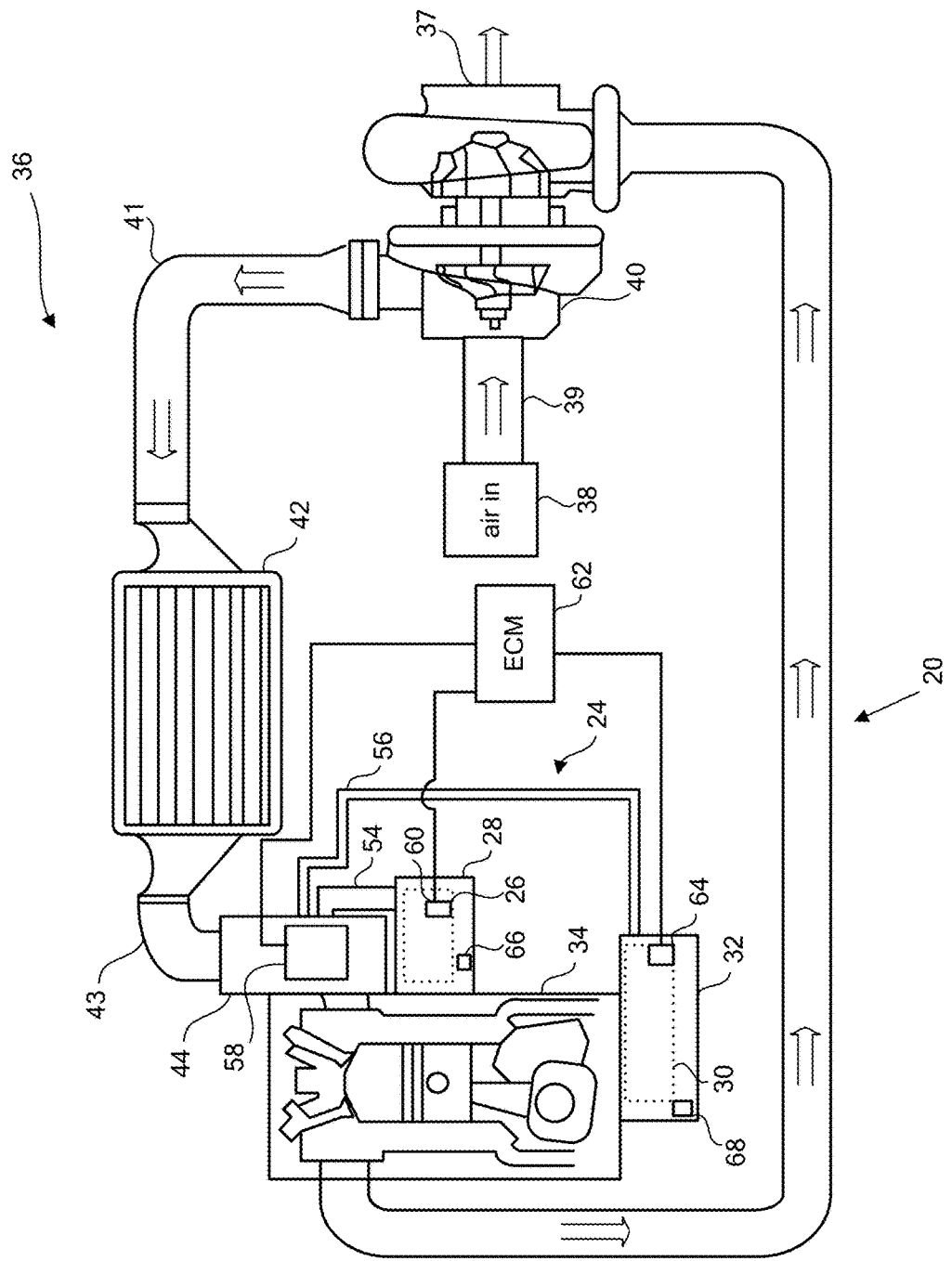

In embodiments shown in FIGS. 8, 11 and 14, in addition to the gases pipe 54, the pressuring system 24 may also include a gases pipe 56 which extends between the intake manifold 44 and the starter motor cover 52 for feeding pressurized gases from the intake manifold 44 to the cavity 30 formed within the starter motor 32. The gases pipe 56 is sealed to the intake manifold 44 and to the starter motor cover 52 and suitable connectors (not shown) may be provided to effect these connections. When pressurized gases are introduced into the cavity 30, a substantially permanent overpressure is generated in the cavity 30 and minimizes the entry of entry of water and/or dust and/or debris and the like into the cavity 30 through any air gaps in the starter motor cover 52. In an embodiment, the gases pipes 54, 56 may be formed with a Y-shape such that a single gases pipe extends from the intake manifold 44, a first branch of the gases pipe extends to the timing belt cover 28, and a second branch extends to the starter motor cover 52. The gases pipe 54, 56 and branches are sealed to the intake manifold 44, the timing belt cover 28 and the starter motor cover 52 and suitable connectors (not shown) may be provided to effect these connections. Therefore, pressurized gases flows from the intake manifold 44 to pressurize both the cavities 26, 30. When pressurized gases are introduced into the cavities 26, 30, a substantially permanent overpressure is generated in the cavities 26, 30 and minimizes the entry of entry of water and/or dust and/or debris and the like into the cavities 26, 30 through any air gaps in the timing belt cover 28 and in the starter motor cover 52.

Figure 9:
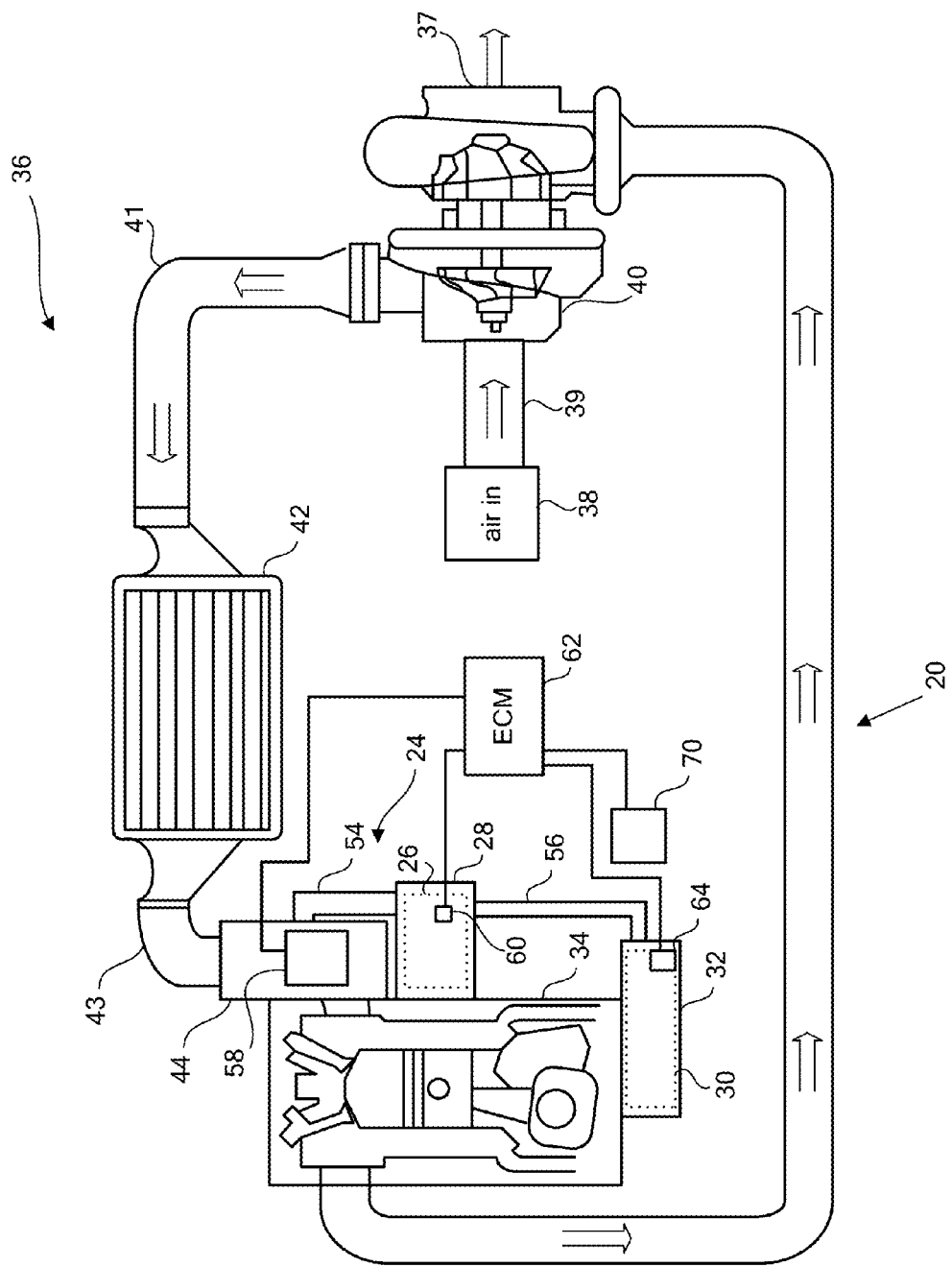
Figure 12:
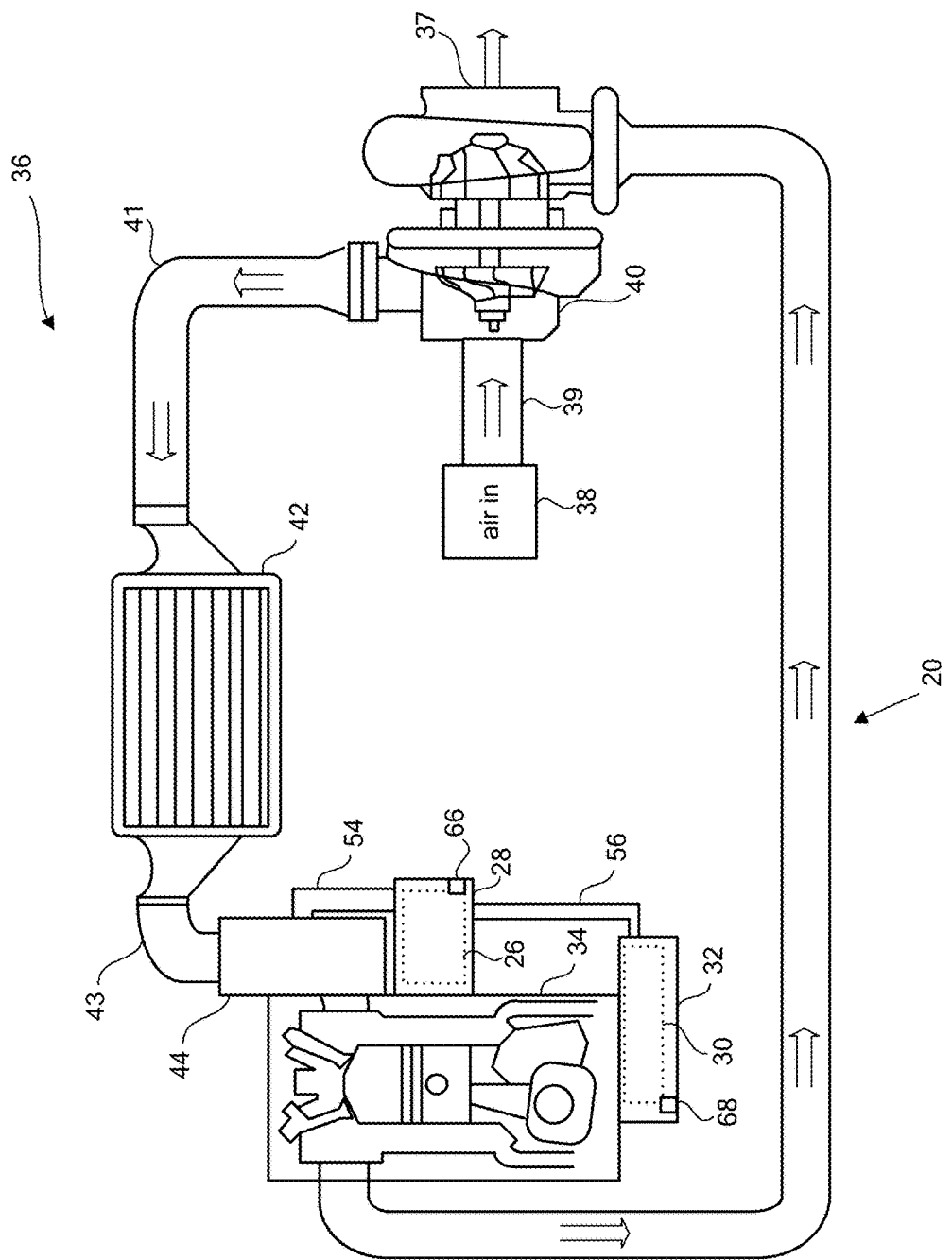
Figure 15:
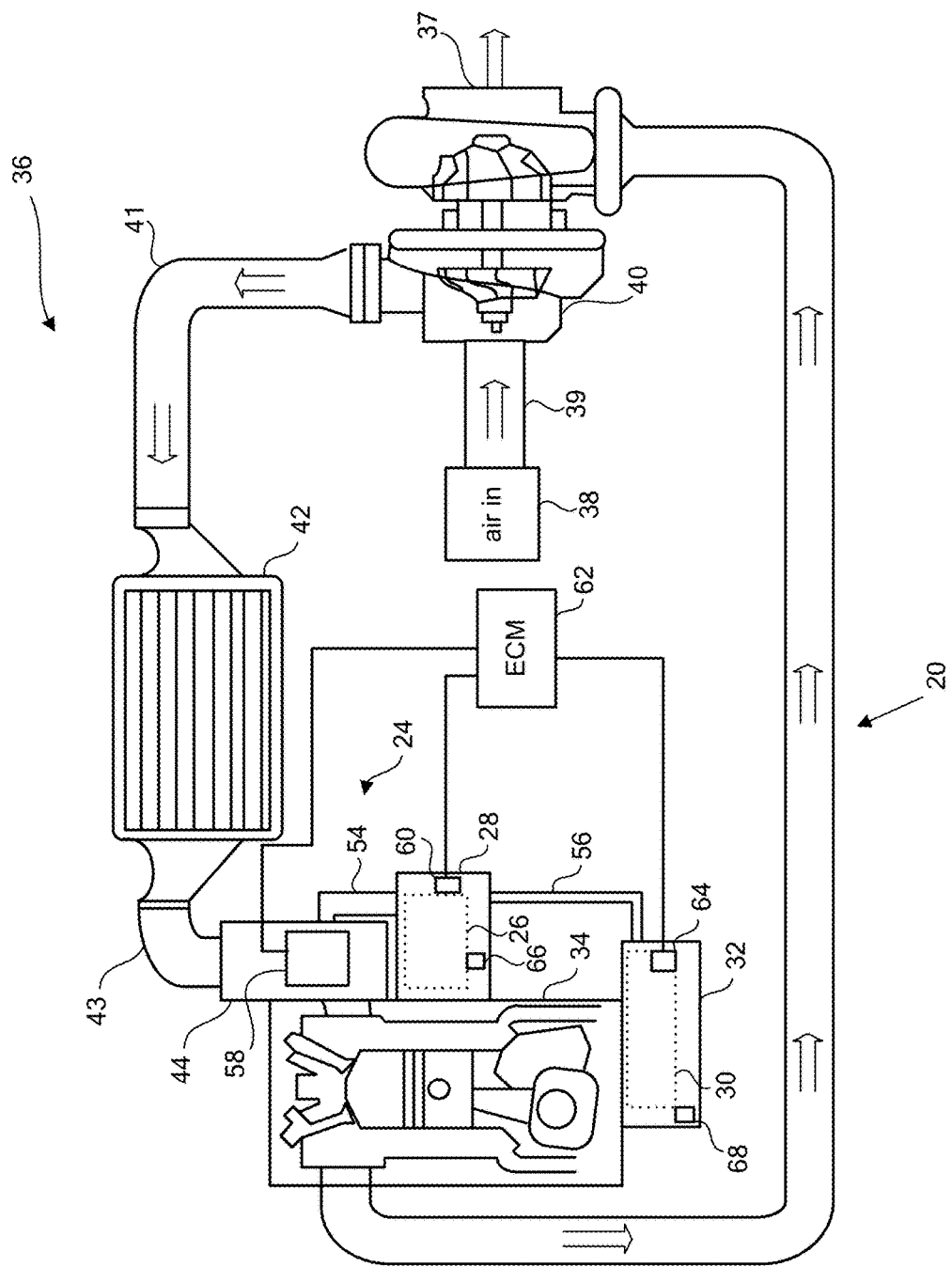

In embodiments shown in FIGS. 9, 12 and 15, the first gases pipe 54 extends from the intake manifold 44 to the timing belt cover 28, and the second gases pipe 56 extends from the timing belt cover 28 to the starter motor cover 52. The gases pipe 54 is sealed to the intake manifold 44 and to the timing belt cover 28 and suitable connectors (not shown) may be provided to effect these connections. The gases pipe 56 is sealed to the intake manifold 44 and to the starter motor cover 52 and suitable connectors (not shown) may be provided to effect these connections. Therefore, pressurized gases flows from the intake manifold 44 to pressurize both the cavities 26, 30. When pressurized gases are introduced into the cavities 26, 30, a substantially permanent overpressure is generated in the cavities 26, 30 and minimizes the entry of entry of water and/or dust and/or debris and the like into the cavities 26, 30 through any air gaps in the timing belt cover 28 and in the starter motor cover 52.

Figure 7:
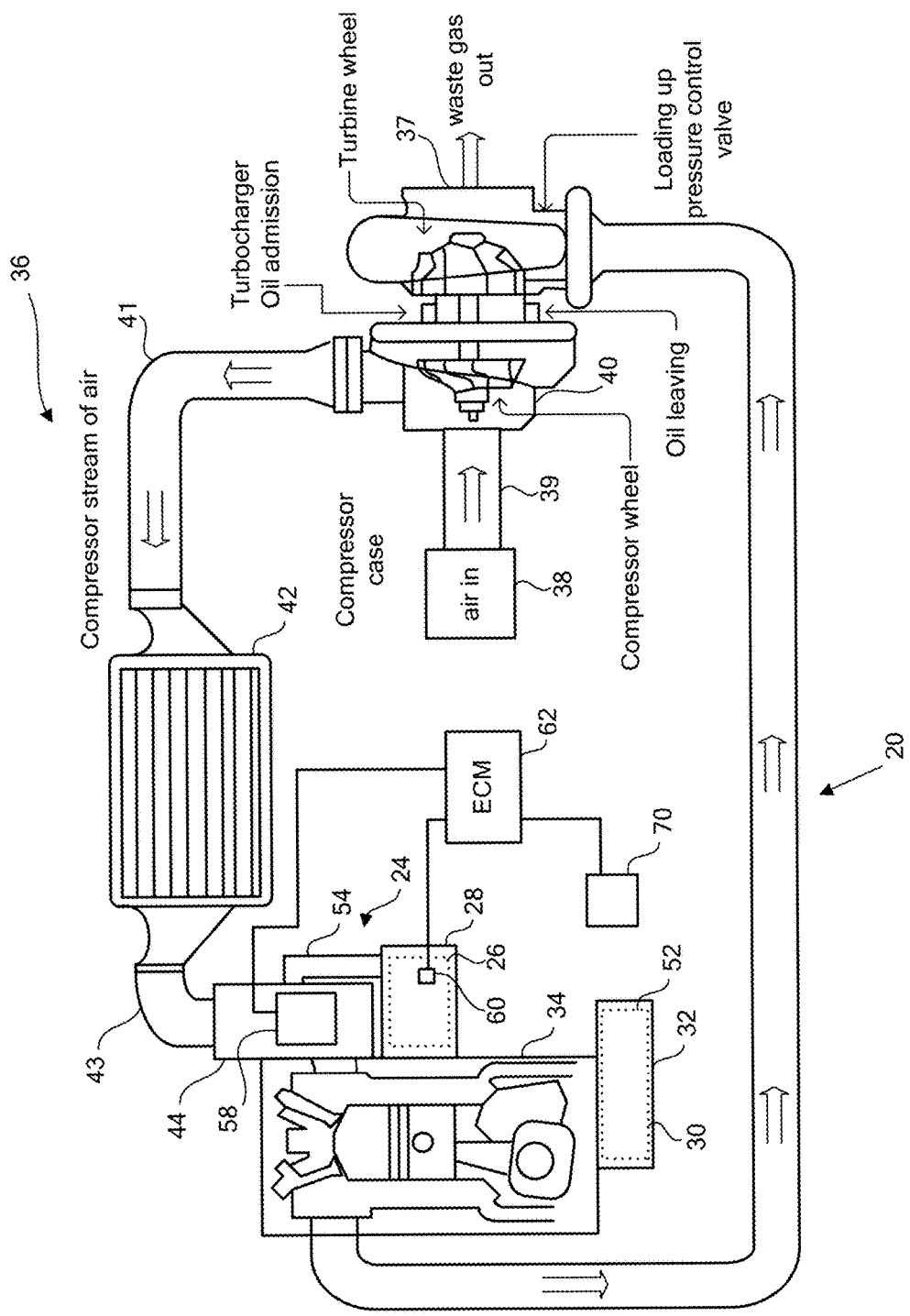
FIGS. 7-18 are schematic views of various embodiments of the engine including a pressuring system which incorporates the features of the disclosure.

In the embodiments shown in FIGS. 7-9, the pressuring system 24 is a closed-loop feedback system and/or method. In these embodiment, the pressuring system 24 includes a control valve 58 and a pressure sensor 60, both of which are in communication with an electronic control module (ECM) 62. As shown, the control valve 58 is mounted on the intake manifold 44. In the embodiments shown in FIGS. 7 and 9, the control valve 58 may be mounted on the gases pipe 54. The pressure sensor 60 may be mounted along the gases pipe 54, in the timing belt cover 28, and/or in the intake manifold 44. If pressurization is provided to the starter motor 32, a pressure sensor 64, see FIGS. 8 and 9, may be provided along the gases pipe 56 or in the starter motor cover 52 and/or in the intake manifold 44. The pressure sensor 64 is not required. The pressure sensor(s) 60, 64 measures the gases pressure and sends information to the ECM 62. The ECM 62 processes the information and is configured to control the opening and the closing of the control valve 58 to appropriately supply gases to the cavity(ies) 26, 30 as necessary for the required amount of pressurization. These embodiments provide a high level of control and may serve to minimize the amount of pressurized gases needed to combat water intrusion, thereby minimizing impact on the performance of the engine 20.

Figure 10:
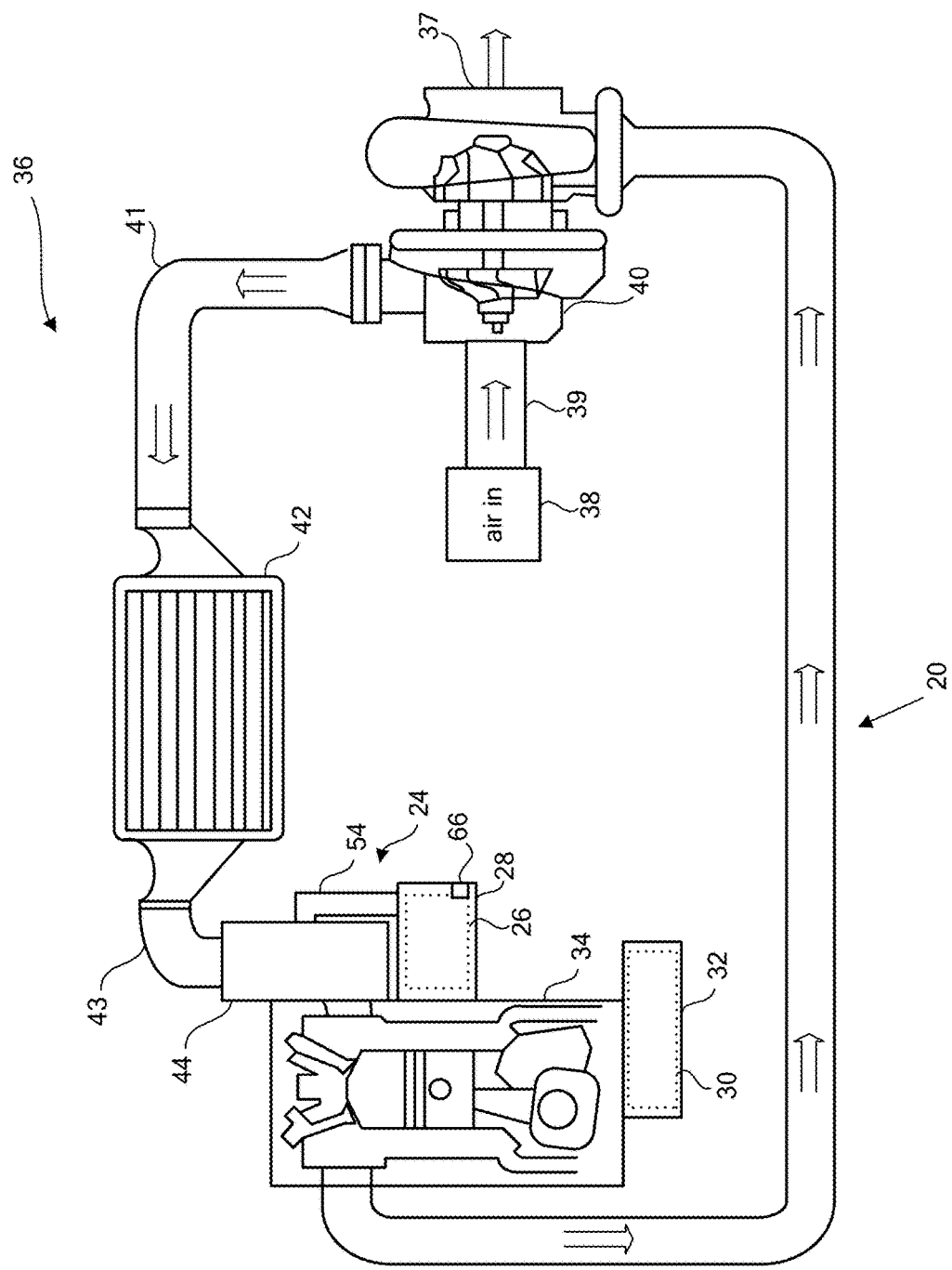

In the embodiments shown in FIGS. 10-12, the control valve 58 is eliminated and the pressuring system 24 includes a pressure relief valve 66 mounted on the timing belt cover 28. Gases are always supplied to the timing belt cover 28 via gases pipe 54. The pressure relief valve 66 opens when the pressure exceeds a predetermined pressure; this minimizes the impact on the oil seals in the timing belt 46 which can operate with limited positive pressure. If pressurization is provided to the starter motor 32 via gases pipe 56 as shown in FIGS. 11 and 12, a pressure relief valve 68 may also be provided on the starter motor cover 52. The pressure relief valve 68 opens when the pressure exceeds a predetermined pressure. The pressure relief valve(s) 66, 68 is a mechanical valve which automatically opens under a predetermined gases pressure and closes when the pressure is reduced to a level below this predetermined gases pressure. Such pressure relief valves are known in the art. Alternatively, the starter motor 32 may not have a separate pressure relief valve 68, and the amount of pressurized gases delivered to the starter motor 32 is controlled by the size of the gases pipe 56 and known levels of leakage to provide the appropriate amount of pressurization.

Figure 13:
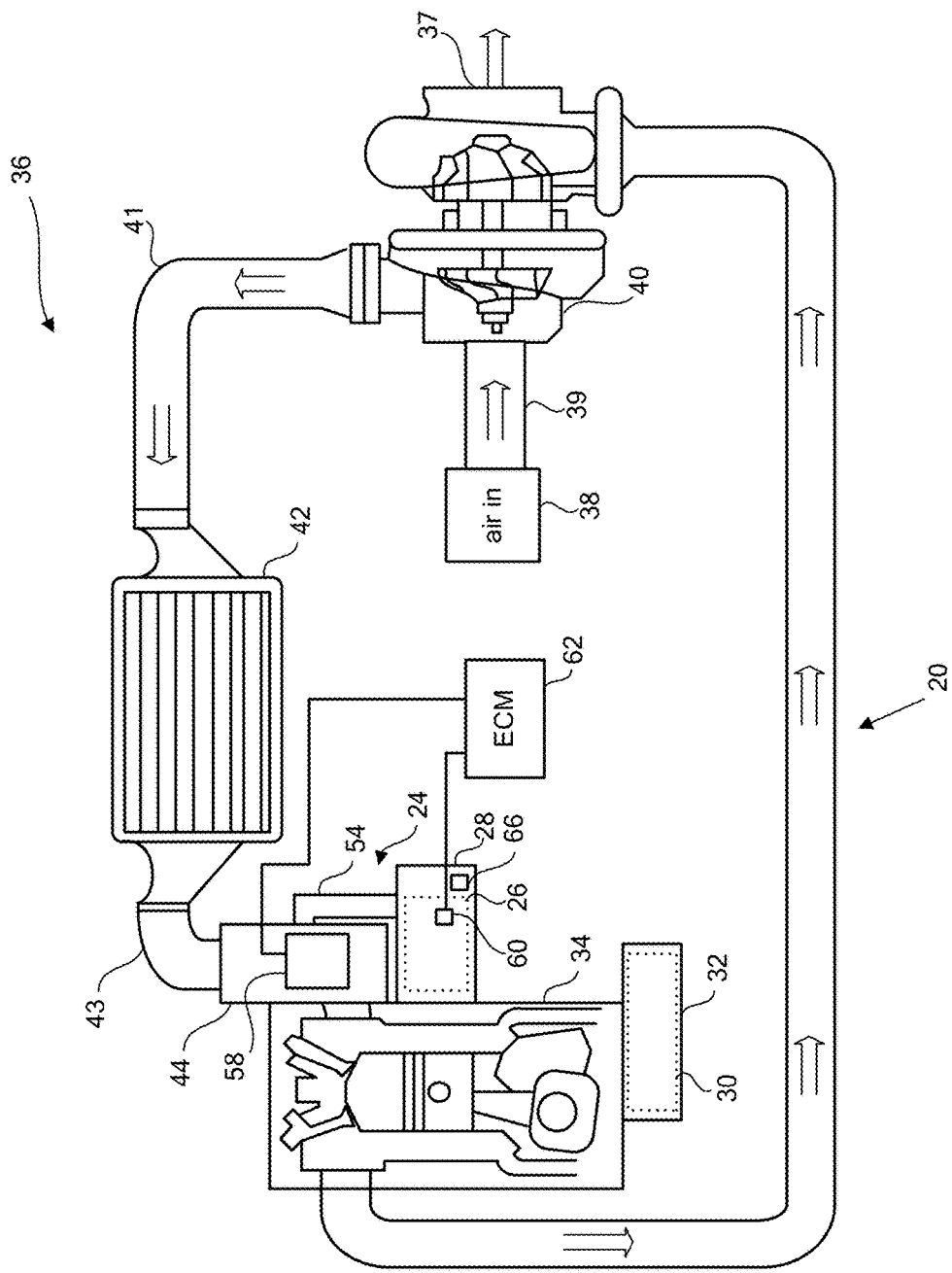

In the embodiments shown in FIGS. 13-15, the control valve 58, the pressure sensor 60 and the pressure relief valve 66 are provided. The control valve 58 and pressure sensor 60 are in communication with the ECM 62 and the control valve 58 is operated by the ECM 62. As shown in FIGS. 14 and 15, the pressure sensor 64 and pressure relief valve 68 may also be included. In these embodiments, if the pressuring system 24 experiences dramatic dynamic pressure changes, the pressure relief valves 66, 68 provide mechanical, instant pressure relief faster than the control valve 58 can provide under control by the ECM 62.

Figure 16:
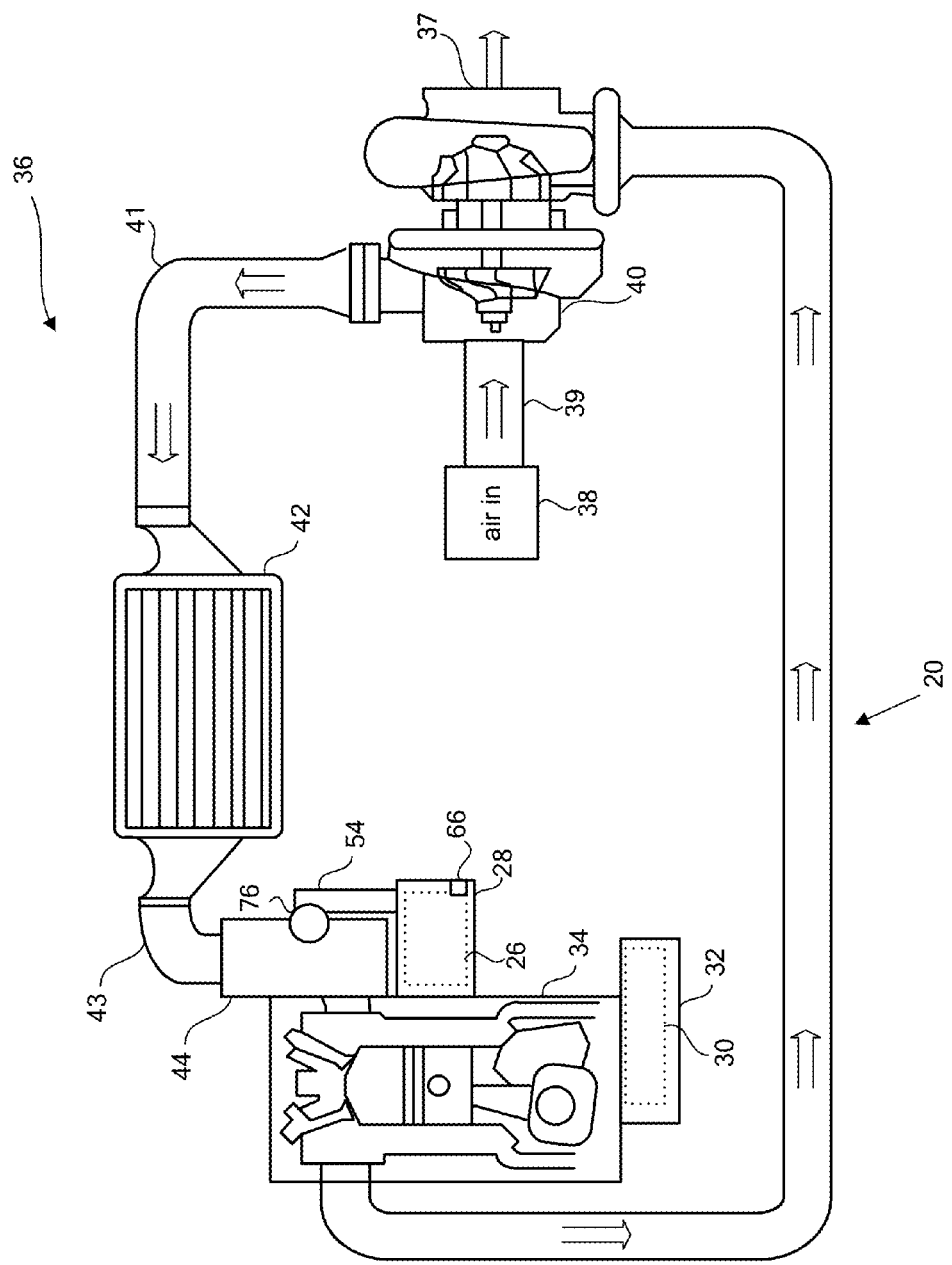
Figure 17:
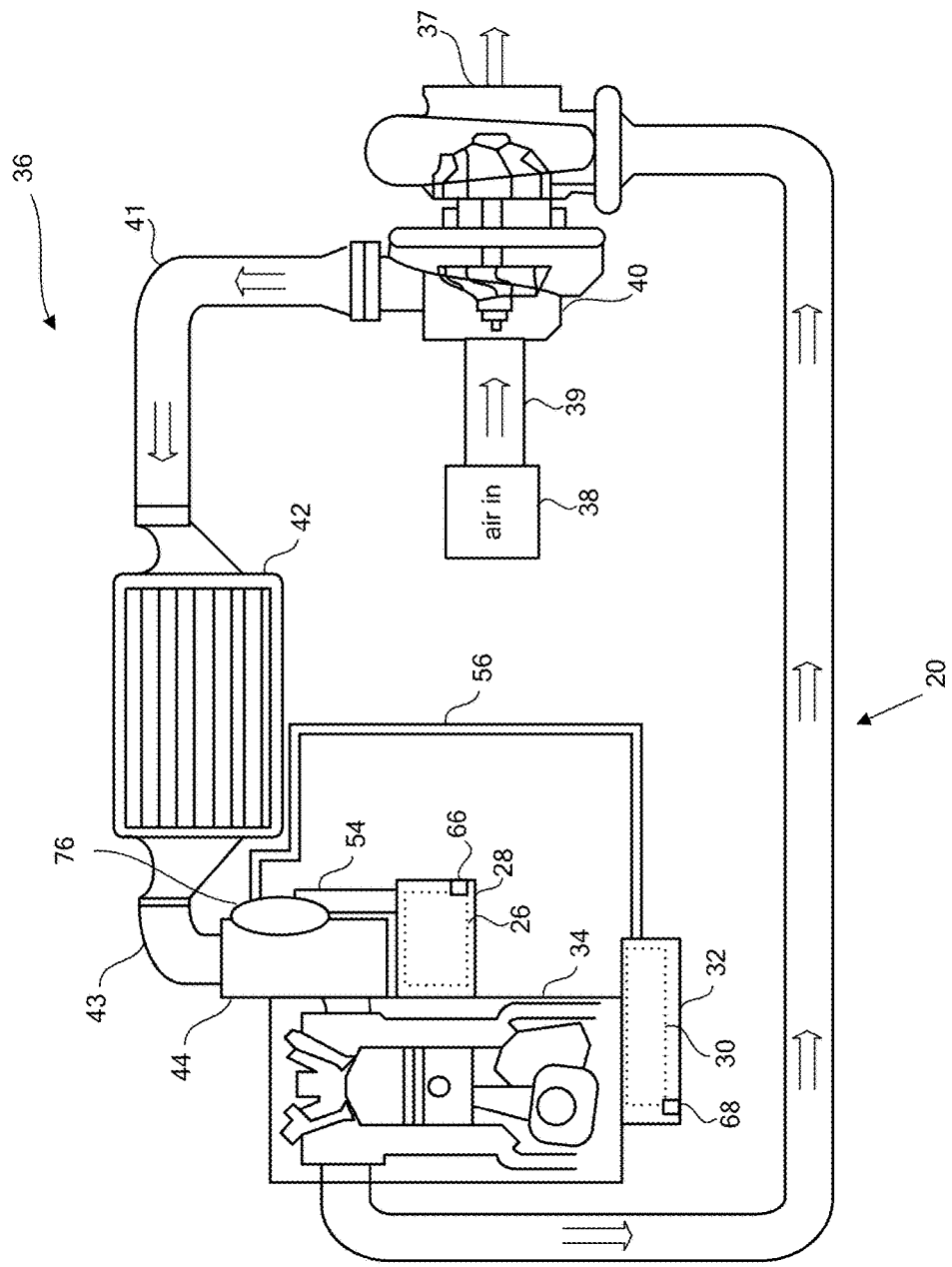
Figure 18:
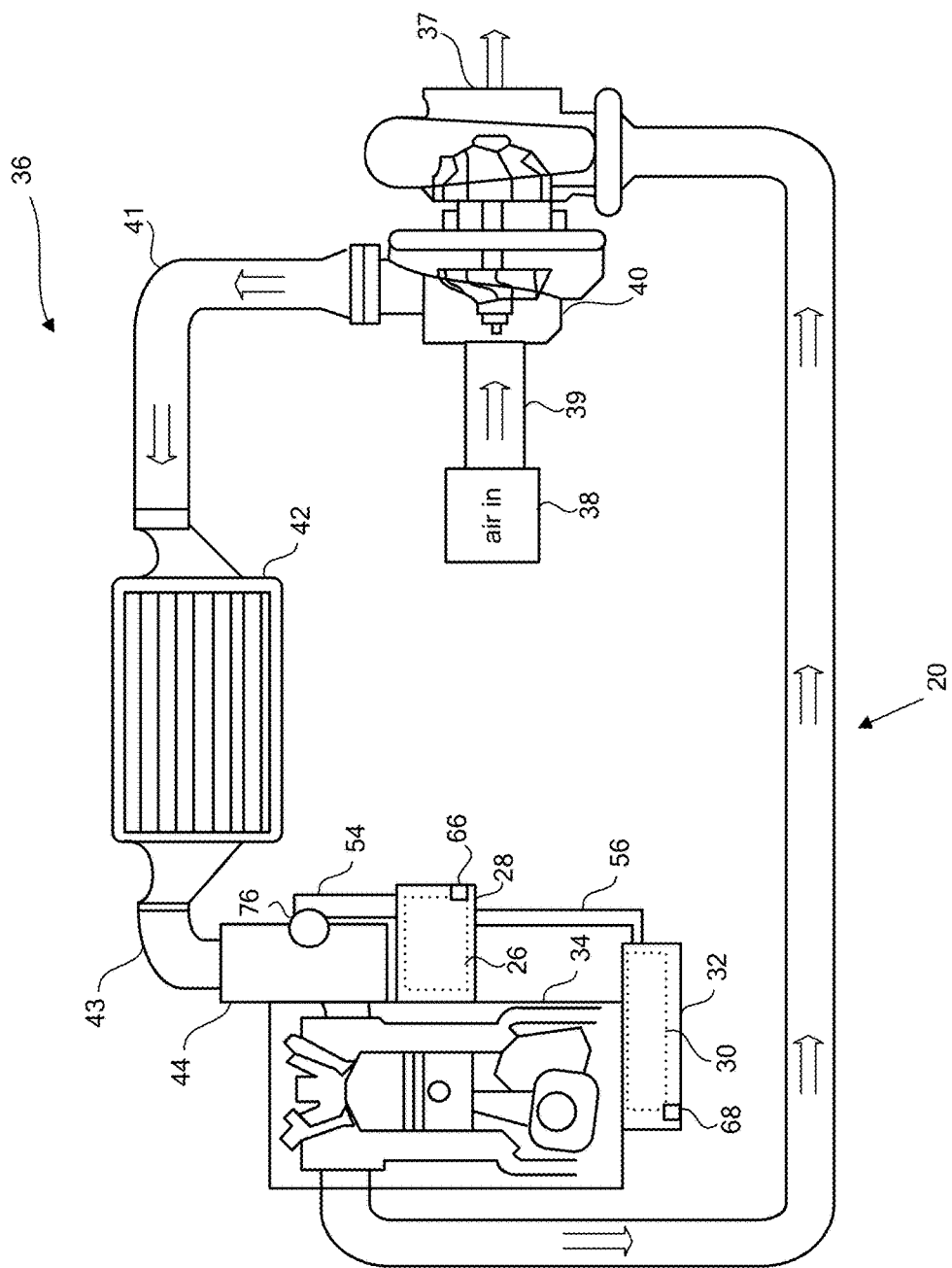

The embodiments shown in FIGS. 16-18 are identical to those of FIGS. 10-12 with the exception that a check valve 76 is mounted on the intake manifold 44 at the point where the gases pipe 54 and/or 56 are provided. The check valve 76 may take the form of a diaphragm. The check valve 76 control gases flowing to the gases pipe(s) 54 and/or 56 from the intake manifold 44. The check valve 76 is a mechanical valve which automatically opens when a positive pressure difference between the intake manifold 44 and gases pipe(s) 54 and/or 56 occurs and closes when the pressure is reduced to a predetermined level. The gases only flow from the intake manifold 44 through the check valve 76 to the gases pipe(s) 54 and/or 56, and do not return through the check valve 76 to the intake manifold 44. Such check valves are known in the art.

The control valve 58 can be electric-controlled or vacuum-controlled. When the control valve 58 is electric-controlled, the control valve 58 is electrically driven; may have an actuator controlling the valve position; the control may be accomplished through a solenoid, stepper motor, or other electric control device. When the control valve 58 is vacuum-controlled, in some embodiments, a vacuum pump may be fitted to the engine 20 or to the alternator to generate the vacuum pressure, controlling the control valve 58. Whether electric-controlled or vacuum-controlled, the control valve 58 may be an "on/off" control valve 58 (either open or closed), or may be a progressive/continuous control valve 58 capable of stopping at any position (or discrete positions) along the spectrum between open and closed. The progressive/continuous control valve 58 may be controlled by the ECM 62 or by an algorithm incorporated into main vehicle electronic control module (not shown) to keep gases pressure in the cavity 26 in the timing belt cover 28 at the desired level.

In an embodiment, a water sensor 70 may be provided to automatically operate the control valve 58 when the vehicle 22 is submerged. The water sensor 70 may be provided on the vehicle 22 or on the engine 20 to sense when the water sensor 70 is submerged which indicates that the engine 20 is submerged. The water sensor 70 is connected to the ECM 62 and information from the water sensor 70 is processed by the ECM 62 and the ECM 62 is configured to operate the control valve 58 to divert pressurized gases from the intake manifold 44 to the timing belt cover 28 and, in some embodiments, to the starter motor cover 52. In an embodiment, a switch 72 on the vehicle dashboard 74 is provided which is connected to the ECM 62 to manually operate the control valve 58 prior to submergence of the vehicle 22. Before submergence, the vehicle 22 operator activates the switch 72; this information is communicated to the ECM 62 and the ECM 62 is configured to operate the control valve 58. In these embodiments, when the vehicle 22 is operating under a normal operating condition (e.g. not submerged), the engine 20 performance is not affected because gases are not diverted to the timing belt cover 28 and in some embodiments to the starter motor 32.

Air is routed from the intake manifold 44 to the cavity(ies) 26, 30 after the air cooler 42 so that cool air is supplied to the cavity(ies) 26, 30 to prevent damage to the components housed therein.

The systems, methods, etc. described above may be implemented in many different ways in many different combinations of hardware, software, firmware, or any combination thereof. In one example, the ECM 62 of the pressurizing system 24 can be implemented with a processor and a memory, where the memory stores instructions, which when executed by the processor, causes the processor to perform the systems and methods, etc.

The ECM 62 can control opening and the closing of the control valve 58 to appropriately supply gases to the cavity(ies) 26, 30 based on various thresholds, parameters, tables, and/or algorithms for determined implementations of the pressurizing system 24. Additionally or alternatively, the ECM 62 may include an interface through which a user may interact with the control valve 58. The ECM 62 may be configured to receive inputs from a user through the interface to allow a user to set or modify one or more thresholds, tables, or algorithms. The ECM 62 may be configured to receive inputs from a user through the interface to allow the user to determine which parameters may be used to open and close the control valve 58. Other variations are possible.

When the ECM 62 determines the specifications for operating the pressurizing system 24, such as when or in what manner to open and close the control valve 58, the ECM 62 may send a signal or instructions to the components of the pressurizing system 24 to operate according to the determined specification. For example, the ECM 62 may send signals to the control valve 58 when it is time for the control value to open or close. In other examples, the ECM 62 may not directly instruct a component to operate according to the determined specifications, but may instead instruct an intermediary component, e.g., an engine control unit, to operate the desired component (e.g., the control valve 58). In still other examples, the ECM 62 may operate the desired components themselves according to the determined specifications. Other variations and examples are possible.

The ECM 62 may include, or be connected with, a user interface or display. The display may provide a visual or audible indicator to a user based on the sensed parameters. This may be useful where a user wishes to monitor parameters or the status of the pressurizing system 24, and/or where the user may wish to manually control parts of the pressurizing system 24. As an example, a user may turn on the pressurizing system 24 when a first light on the display is on (or in another state, such as a different color, flashing pattern, or sequence), e.g., noting water and/or debris entering into the cavities 26, 30. The user may monitor a light, such as a second light, on the display. The second light may be turned on when the ECM 62 determines, based on a sensed parameter, that the pressurizing system 24 may be terminated, e.g., when the environment is clear of water and/or debris. The second light may remain on until the user turns off the pressurizing system 24. In other examples, the display may provide information about the sensed parameter, information about the operation of the pressurizing system 24 such as its operating history and its present operating conditions, information about a load, or various other information. Other examples are possible. Additionally or alternatively, the ECM 62 can automatically turn on and off the pressurizing system 24, e.g., based on the sensed operating parameters.

The systems, methods, devices, and logic described above may be implemented in many different ways in many different combinations of hardware, software or both hardware and software. For example, parts of the pressurizing system 24, including the ECM 62, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

The methods described may include determinations in relation to one or more thresholds. While these methods may refer to a determination about whether a parameter exceeds a threshold, the determination may in other variations be whether the parameter is greater than or equal to, less than, equal to, or less than or equal to a threshold. Other variations are possible.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

What is claimed is:

1. A pressuring system for a vehicle engine, comprising:
a compressor including an inlet for receiving ambient gases, wherein the compressor is configured to compress the ambient gases to compressed gases having a higher pressure than the ambient gases;
an intake manifold including an inlet for receiving the compressed gases;
a control valve connected to the intake manifold;
an electronic control module connected to the control valve and configured to operate the control valve;
an engine block connected to the intake manifold and connected to a gases outlet, wherein a first portion of the compressed gases is fed to the engine block;
a timing belt cover connected to the engine block; and
a gases pipe connected between the control valve and the timing belt cover, wherein the electronic control module communicates with the control valve to cause the control valve to direct a second portion of the compressed gases through the gases pipe from the intake manifold to an interior of the timing belt cover.

2. The pressuring system of claim 1, wherein the control valve is electrically controlled.

3. The pressuring system of claim 1, wherein the control valve is vacuum controlled.

4. The pressuring system of claim 1, further comprising a pressure relief valve mounted on the timing belt cover.

5. A pressuring system for a vehicle engine, comprising:
an intake manifold;
a control valve connected to the intake manifold;
an engine block connected to the intake manifold and connected to a gases outlet; a timing belt cover connected to the engine block;
a gases pipe connected between the control valve and the timing belt cover; and
a starter motor connected to the engine block, the starter motor having a starter motor cover; and
wherein the gases pipe is further connected between the control valve and the starter motor cover.

6. The pressuring system of claim 5, further comprising a pressure relief valve mounted on the starter motor cover.

7. The pressuring system of claim 5, wherein the control valve is activated by a manually controllable switch.

8. A pressuring system for a vehicle engine, comprising:
an intake manifold;
a control valve connected to the intake manifold;
an engine block connected to the intake manifold and connected to a gases outlet;
a timing belt cover connected to the engine block;
a gases pipe connected between the control valve and the timing belt cover;
a starter motor connected to the engine block, the starter motor having a starter motor cover; and
a second gases pipe connected between the timing belt cover and the starter motor cover.

9. The pressuring system of claim 8, further comprising a pressure relief valve mounted on the starter motor cover.

10. A pressuring system for a vehicle engine, comprising:
an intake manifold;
a control valve connected to the intake manifold;
an engine block connected to the intake manifold and connected to a gases outlet;
a timing belt cover connected to the engine block;
a gases pipe connected between the control valve and the timing belt cover;
an electronic control module is connected to the control valve and configured to operate the control valve; and
a water sensor connected to the electronic control module, wherein the electronic control module is configured to control operation of the control valve in response to information received from the water sensor.

* * * * *